Sept. 23, 1969 R. BARTON ET AL 3,469,241

DATA PROCESSING APPARATUS PROVIDING CONTIGUOUS ADDRESSING FOR NON-CONTIGUOUS STORAGE

Filed May 2, 1966

INVENTORS
R. BARTON
L.A. HITTEL
L.L. RAKOCZI
J.B. WIENER

BY

United States Patent Office 3,469,241

Patented Sept. 23, 1969

3,469,241

DATA PROCESSING APPARATUS PROVIDING CONTIGUOUS ADDRESSING FOR NON-CONTIGUOUS STORAGE

Richard Barton, Lorenz A. Hittel, and Laszlo L. Rakoczi, Phoenix, Ariz., and Jerome B. Wiener, Armonk, N.Y., assignors to General Electric Company, a corporation of New York Filed May 2, 1966, Ser. No. 546,716
Int. Cl. G11b *13/00;* G06f *1/00*
U.S. Cl. 340—172.5 18 Claims

ABSTRACT OF THE DISCLOSURE

A multiprogram computer system is disclosed in which the memory cells in which the data words are stored are divided into a series of blocks, or sets, of such cells. The data processing unit of the system, when it is to communicate with the memory, supplies a group of signals which symbolically represent the addresses of memory cells, all the cells so addressed in executing a given program being symbolically located in contiguous blocks, or sets, of such cells. The symbolic address of each word is applied to a translating device which produces signals which represent the actual addresses of a cell including the actual block in which such cell is located, but in which the actual blocks, or sets, of cells actually addressed are non-contiguous, and which signals are applied to the memory for transferring a data word between the processor and the memory by means of a transmission member.

This invention relates to multicomputer and multiprogrammed systems and more particularly to apparatus for exercising management control of a multicomputer or multiprogrammed data processing system.

The multicomputer system is a data processing system comprising a plurality of data processing units, one or more data storage units, and a plurality of input devices and output devices. The data processing units process data by executing separate programs simultaneously and independently of each other. The data storage units store data to be processed, data which is the result of processing, and programs for controlling the processing operations of the data processing units. The input devices supply programs and data to be processed and the output devices receive and utilize processed data.

The multiprogrammed system is a data processing system wherein one or more data storage units store concurrently a plurality of independent programs or portions of such programs. A multiprogrammed system having but one data processing unit alternately executes the stored programs. The multicomputer system functions as a multiprogrammed system, wherein the plural data processing units simultaneously execute respective ones of the plural stored programs.

Communication must be provided within the data processing systems described to transfer programs and data to be processed from the data storage units to the data processing units and to transfer processed data from the data processing units to the data storage units. Communication must also be provided to transfer programs and data to be processed from the input devices to the data storage units and to transfer processed data from the data storage units to the output devices.

The apparatus of the instant invention provides management control for such multicomputer or multiprogrammed systems. Generally, management control of the multicomputer system described comprises expeditiously supplying data to be processed and the programs providing the required data processing functions to the data processing units, and efficiently controlling the output devices to receive and utilize the processed data. This management control is effected by providing and controlling all required communications between data processing units and data storage units and between input and output devices and data storage units; by providing for the assignment of programs to data processing units for execution in accordance with the required urgencies for execution of the different programs, the availability of the required input and output devices, the availability of the required data storage space in the data storage units, and the relative capabilities of the data processing units for executing the different programs; by providing termination of the programs nearing completion and their replacement with other waiting programs; by providing assignment of specific data storage units for programs to be executed; by providing assignment of specific input and output devices for programs to be executed, and initiation and termination of data transfer operations by these devices; by providing the corrective functions required when program or data errors are detected by the data processing units, or when the data processing units become partially or totally inoperative; etc.

Each data processing unit of a multicomputer or multiprogrammed system executes a program independently of the other stored programs. The program comprises a set of instructions, each instruction specifying a discrete type of processing operation. A data processing unit executes a program by sequentially responding to each of the instructions of the program to perform the corresponding operations. The data processing unit obtains the instructions of a program in sequence from a set of storage locations, or "cells," in the data storage system, which comprises the plurality of data storage units. Each such cell is identified by a unique identification, termed an "address." Thus, in obtaining the instructions of a program in proper sequence the data processing unit supplies the corresponding addresses in sequence. Additionally, many of the instructions during execution require the data processing unit to further communicate with the data storage system, either to obtain a data item on which the data processing unit is to perform an operation or to store a data item which is the result of an operation. Accordingly, each instruction requiring a transfer of a data item between the data processing unit and the data storage system must also identify the cell which is to supply or receive the data item. Therefore, each program requires a set of cells for storing and supplying data items to be processed by the program, for receiving and storing data items which are the result of processing operations performed by the program, and for storing the instructions of the program, many of the stored instructions comprising an identification of a cell in the set.

A program is only executed by the multicomputer or multiprogrammed system after it has been presented for execution by an input device. An advanced form of management control provides most effective and efficient execution of the waiting programs if, instead of waiting for the availability of specific storage space, each waiting program is accepted from an input device and transferred to the data storage system as soon as the data storage system has free any storage space which is of sufficient capacity and which is provided by the required combination of data storage unit types. After transfer to the data storage system these programs are executed according to their relative urgencies and the availability of the input and output devices required by each program.

However, in utilizing this advanced form of management control the particular portion of the data storage system in which a program is to be stored and executed is not determinable when the program is prepared or when it is being presented by an input device; instead, the storage portion to be employed varies according to the other programs already present when a program is accepted into the data storage system. Accordingly, the instructions in each program which identify data storage system cells can identify neither specific data storage units nor specific cells in a data storage unit; instead, the instructions can identify only symbolically the relative disposition of the cells in which the program is to be executed. In obtaining the instructions of the program in proper sequence, the data processing unit must employ in sequence symbolic identifications, or symbolic addresses, of cells appropriately disposed relative to the cells identified by the symbolic addresses provided by the instructions. Additionally, the symbolic addresses supplied by a data processing unit during execution of a program will identify symbolically a contiguous set of data storage system cells within which the instructions, the data items to be processed, and the processed data items are stored or to be stored.

The copending U.S. patent application Ser. No. 508,168 of J. P. Barlow, R. Barton, J. E. Belt, C. R. Frasier, L. A. Hittel, L. L. Rakoczi, M. A. Torfeh, and J. B. Wiener for Apparatus Providing Symbolic Memory Addressing in a Multicomputer System, filed Nov. 16, 1965, and assigned to the assignee of the instant invention, describes and claims an invention providing an advanced form of management control apparatus for a multicomputer or multiprogrammed system. The management control apparatus of the aforementioned patent application provides for simply, reliably and rapidly converting the symbolic identificaitons of the storage cells supplied by the programs and the data processing units into corresponding actual addresses of the storage cells in which the instructions of the program, the data items to be processed, and the processed data items are stored or to be stored. The management control apparatus comprises an address translator coupled to the data processing units for receiving each symbolic address as it is presented when a data processing unit is to communicate with the system of data storage units. Upon receiving each symbolic address the translator responds to generate a unique actual address which represents a specific cell in a specific data storage unit. Thus, the address translator employed in the aforementioned invention enables a plurality of programs employing similar series of symbolic addresses to communicate with unique portions of the data storage system for execution.

In a multiprogrammed system the amount of storage space in the data storage system required for storage and execution of each of the plural programs is usually different for each such program. Thus, one program may require a storage space many times greater than the storage space required by another program. The management control apparatus described heretofore provides for insertion of waiting programs into the storage space provided by terminating programs, in preparing for the execution of the waiting program. A waiting program cannot be inserted into the storage system until sufficient storage space has freed by terminating programs to provide the total storage requirements of the waiting program.

If the waiting program is relatively large compared to the terminating programs, several programs may have to terminate before the amount of storage space which is thereby freed is equal to or greater than the requirements of the waiting program. Since freedom is provided in independently supplying the various programs to be executed, successively terminating programs will not ordinarily occupy contiguously addressable portions of the storage system. It is desirable, therefore, in order to enable more continuous and efficient use of the storage system, and in order to accommodate a waiting program as expeditiously as possible, to provide apparatus enabling the storage and execution of a program in plural portions of the storage system which are not necessarily contiguous. Such apparatus provided must enable the storage and execution of the programs of a multiprogrammed data processing system in non-contiguous portions of the storage system, even though when each such program is executed by a data processing unit, the symbolic addresses provided comprise a contiguous set.

Therefore, it is an object of this invention to provide improved management control apparatus for implementing the effective and efficient execution of the programs in multicomputer and multiprogrammed systems.

Another object of this invention is to provide apparatus for enabling improved communication between a data storage system and a data processing unit which symbolically identifies locations in the data storage system.

Another object of this invention is to provide apparatus for enabling each of the plural programs of a multiprogrammed system to be executed with respect to non-contiguous portions of the data storage system.

Another object of this invention is to provide apparatus for enabling a program providing a series of contiguous memory system symbolic addresses during execution to be executed with respect to non-contiguously addressed cells of the memory system.

Another object of this invention is to provide apparatus for enabling each of the plural programs of a multiprogrammed system to occupy non-contiguous portions of the data storage system.

The foregoing objects are achieved, according to one embodiment of the instant invention, by providing a data processing system wherein a series of symbolic data storage system identifications, which represent the addresses of a corresponding series of contiguously addressable data storage cells, supplied by a data processing unit during execution of a program are applied to a translating apparatus, and wherein the translating apparatus translates the symbolic series to a series of actual designations of sets of contiguous cells in the data storage system, such sets being non-contiguous. A data transmission member provides selective and controllable communication between the one or more data processing units and the one or more data storage units of the data processing system. When a data processing unit is to communicate with the data storage system to receive an instruction, to receive a data item to be processed or to transmit a processed data item, the data processing unit supplies a first signal group symbolically representing the address of a cell in the data storage system. An address translating device is coupled to the data processing units for receiving these symbolic addresses. Upon receiving each symbolic address the address translating device responds to generate a corresponding second signal group which represents a specific cell in a specific data storage unit. During execution of a particular program the data processing unit supplies a series of first signal groups symbolically representing the addresses of a corresponding series of contiguous cells of the storage system. The tranlating device responds to this series of first signal groups to provide a series of second signal groups representing the actual addresses of a plurality of non-contiguous blocks, each block comprising a predetermined number of contiguous cells.

Following generation of a second signal group by the address translating device, additional apparatus provides transfer of the second signal group to the data storage system. Upon receiving the actual address represented by a second signal group, a data storage unit initiates an operation to provide the required communication between the specifically addressed cell thereof and the initiating data processing unit through the data transmission member.

Accordingly, by providing each program the capability of execution with respect to a non-contiguous distribution of blocks of cells throughout the memory system, the novel address translating apparatus provides unusual flexibility in scheduling and assigning programs for execution in a multiprogrammed system and provides most continuous, effective, and efficient utilization of the multiprogrammed system.

Certain portions of the apparatus herein disclosed are not of our invention, but are the inventions of:

C. R. Frasier, L. A. Hittel, J. R. Hudson, L. L. Rakoczi, D. L. Sansbury and J. B. Wiener, as defined by the claims of their application, Ser. No. 550,037, filed May 13, 1966, entitled: Program Request Storage and Control Apparatus in a Multiprogrammed Data Processing System.

S. F. Aranyi, J. P. Barlow, L. L. Rakoczi, and M. A. Torfeh, as defined by the claims of their application, Ser. No. 550,562, filed May 16, 1966, entitled: Data Storage Access Control Apparatus, for a Multicomputer System.

J. E. Belt, L. A. Hittel, G. R. Hope, Jr., E. J. Porcelli, and L. L. Rakoczi, as defined by the claims of their application, Ser. No. 551,355, filed May 19, 1966, entitled: Apparatus Providing Inter-Processor Communication and Program Control in a Multicomputer System.

S. F. Aranyi, J. P. Barlow, R. Barton, L. L. Rakoczi, and M. A. Torfeh, as defined by the claims of their application, Ser. No. 551,657, filed May 20, 1966, entitled: Multi-Word Storage Access Control Apparatus for a Data Processing System.

J. P. Barlow, C. R. Jones, and J. L. Kerr, as defined by the claims of their applicatoin, Ser. No. 559,305, filed June 21, 1966, entitled: Apparatus Providing a Unique Decision Signal for Concurrent Interrogation Signals.

W. W. Chu and N. R. Crain, as defined by the claims of their application, Ser. No. 559,497, filed June 22, 1966, entitled: Apparatus for Providing Controllable Delays.

S. F. Aranyi, J. P. Barlow, E. J. Porcelli, L. L. Rakoczi, and M. A. Torfeh, as defined by the claims of their application, Ser. No. 568,343, filed July 27, 1966, entitled: Interprocessing Multicomputer Systems.

J. E. Belt, L. A. Hittel, and L. L. Rakoczi, as defined by the claims of their application, Ser. No. 612,560, filed January 30, 1967, entitled: Apparatus Providing Identification of Programs in a Multiprogrammed Data Processing System.

J. P. Barlow, R. Barton, L. L. Rakoczi, and M. A. Torfeh, as defined by the claims of their application, Ser. No. 618,076, filed February 23, 1967, entitled: Data Storage Access Control Apparatus for a Multicomputer System.

J. P. Barlow, R. Barton, E. J. Porcelli, L. L. Rakoczi, and M. A. Torfeh, as defined by the claims of their application, Serial No. 619,377, filed February 28, 1967, entitled: Data Storage Access Control Apparatus for a Multicomputer System.

S. F. Arnayi, J. P. Barlow, L. L. Rakoczi, L. A. Hittel and M. A. Torfeh, as defined by the claims of their application, Ser. No. 623,284, filed March 15, 1967, entitled: Data Storage Access Control Apparatus for a Multicomputer System and J. R. Hudson, L. L. Rakoczi, and D. L. Sansbury, as defined by the claims of their application, Ser. No. 646,504, filed on or about June 16, 1967, entitled: Program Interruption and Assignment Apparatus in a Multiprogrammed Data Processing System all such applications being assigned to the assignee of the present application.

Description of drawings

The invention will be described with reference to the accompanying drawings, wherein.

Figure 1:
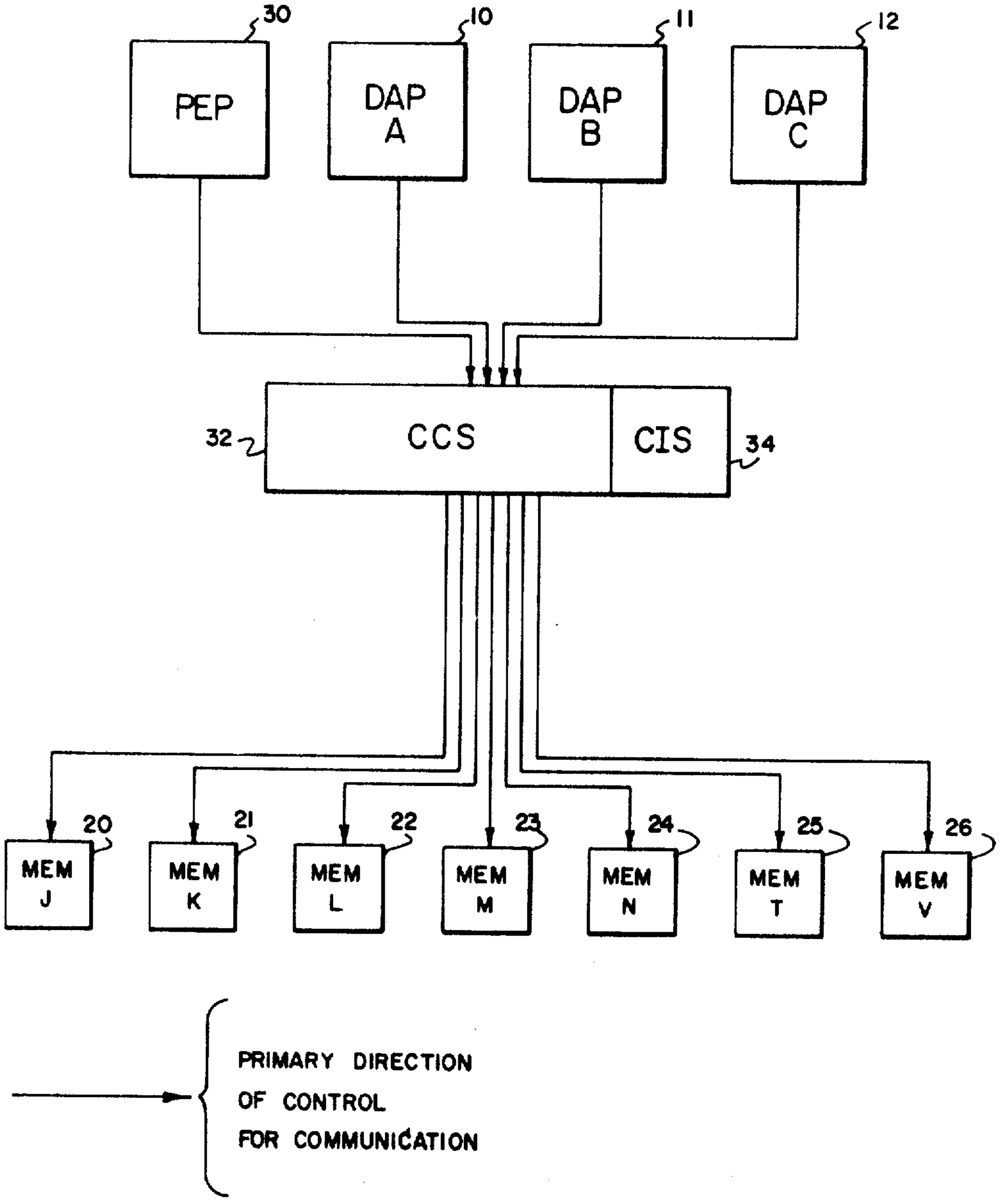
FIGURE 1 is a block diagram of a multicomputer data processing system to which the instant invention is applicable.

For a complete description of the system of FIGURE 1 and of my invention, reference is made to U.S. patent application, Ser. No. 542,768, filed Apr. 15, 1966, now Patent No. 3,444,525, entitled "Centrally Controlled Multicomputer System" by Jesse P. Barlow et al., and assigned to the assignee of the present invention. More particularly, attention is directed to FIGURES 2 through 110 of the drawings and to the specification beginning at col. 8, line 4, and ending at col. 173, line 9, inclusive of U.S. patent application, Ser. No. 542,768, which are incorporated herein by reference and made a part hereof as if fully set forth herein.

What is claimed is:

1. For employment with a data processing unit and a data storage member, said member storing a data word in each one of a plurality of addressable storage cells, the combination comprising: a data word transmission member; said processing unit being adapted to receive data words from said transmission member, to execute a plurality of different operations on received data words, and to transfer data words representeng the results of said operations to said transmission member, said processing unit supplying a series of first signal groups symbolically representing the addresses of a corresponding series of contiguous ones of said cells when said processing unit is to communicate with said storage member; said storage member being responsive to a second signal group representing the actual address of one of said cells for transferring a data word between said cell and said transmission member; and an address translating device coupled to said processing unit to receive each of said first signal groups and responsive thereto for generating a corresponding one of said second signal groups, said translating device responding to said series of first signal groups to provide a series of second signal groups representing the actual addresses of a plurality of sets of contiguous cells, said sets being non-contiguous, said translating device being coupled to deliver said second signal groups to said storage member.

2. For employment with a data processing unit and a plurality of data storage members, each of said members storing a data word in each one of a respective plurality of addressable storage cells, the combination comprising: a data word transmission member; said processing unit being adapted to receive data words from said transmission member, to execute a plurality of different operations on received data words, and to transfer data words representing the results of said operations to said transmission member, said processing unit supplying a series of first signal groups symbolically representing the addresses of a corresponding series of contiguous ones of said cells when said processing unit is to communicate with said storage members; each of said storage members being responsive to a second signal group representing the actual address of one of the cells in said storage member for transferring a data word between said cell and said transmission member; and an address translating device coupled to said processing unit to receive each of said first signal groups and responsive thereto for generating a corresponding one of said second signal groups, said translating device responding to said series of first signal groups to provide a series of second signal groups representing the actual addresses of a plurality of sets of cells, each of said sets comprising contiguous cells with in one of said storage members, said sets being non-contiguous, said translating device being coupled to deliver said second signal groups to said storage members.

3. For employment with a data storage member and a plurality of data processing units, said member storing a data word in each one of a plurality of addressable storage cells, the combination comprising: a data word transmission member; said processing units being adapted to receive data words from said transmission member, to execute a plurality of different operations on received data words, and to transfer data words representing the results of said operations to said transmission member, each of said processing units supplying a respective series of first signal groups symbolically representing the addresses of a corresponding series of contiguous ones of said cells when said processing unit is to communicate with said storage member; said storage member being responsive to a second signal group representing the actual address of one of said cells for transferring a data word between said cell and said transmission member; and an address translating device coupled to said processing units to receive each of said first signal groups and responsive thereto for generating a corresponding second signal group, said translating device responding to each of said series of first signal groups to provide a respective series of second signal groups representing the actual addresses of a plurality of sets of contiguous cells, the sets represented by each of said series of second signal groups being non-contiguous, said translating device being coupled to deliver said second signal groups to said storage member.

4. The combination of claim 3, wherein the sets of cells represented by substantially all of said series of second signal groups are contiguous.

5. The combination of claim 3, wherein one portion of all of said series of second signal groups represents unique sets of cells and another portion of all of said series of second signal groups represents the same set of cells.

6. For employment with a plurality of data processing units and a plurality of data storage members, each of said members storing a data word in each one of a respective plurality of addressable storage cells, the combination comprising: a data word transmission member; said processing units being adapted to receive data words from said transmission member, to execute a plurality of different operations on received data words, and to transfer data words representing the results of said operations to said transmission member, each of said processing units supplying a respective series of first signal groups symbolically representing the addresses of a corresponding series of contiguous ones of said cells when said processing unit is to communicate with said storage members; each of said storage members being responsive to a second signal group representing the actual address of one of the cells in said storage member for transferring a data word between said cell and said transmission member; and an address translating device coupled to said processing units to receive each of said first signal groups and responsive thereto for generating a corresponding second signal group, said translating device responding to each of said series of first signal groups to provide a respective series of second signal groups representing the actual addresses of a plurality of sets of contiguous cells, each of said sets comprising contiguous cells within one of said storage members, the sets represented by each of said series of second signal groups being non-contiguous, said translating device being coupled to deliver said second signal groups to said storage members.

7. The combination of claim 6 wherein said translating device is further coupled to deliver each of said second signal groups to the one of said storage members comprising the cell represented by said second signal group.

8. The combination of claim 6 wherein said translating device is further coupled to deliver each of said second signal groups to the one of said storage members comprising the cell represented by said second signal group.

9. For employment with a data processing unit and a data storage member, said member storing a data word in each one of a plurality of addressable storage cells, the combination comprising: a data word transmission member; said processing unit being adapted to receive data words from said transmission member, to execute a plurality of different operations on received data words, and to transfer data words representing the results of said operations to said transmission member, said processing unit supplying a series of first signal groups symbolically representing the addresses of a corresponding series of contiguous cells when said processing unit is to communicate with said storage member; said storage member being responsive to a second signal group representing the actual address of one of said cells for transferring a data word between said cell and said transmission member; and an address translating device coupled to said processing unit to receive each of said first signal groups and responsive thereto for generating a corresponding one of said second signal groups, said translating device responding to said series of first signal groups to provide a series of second signal groups representing the actual addresses of a plurality of non-contiguous sets of cells, said translating device being coupled to deliver said second signal groups to said storage member.

10. For employment with a data processing unit and a data storage member, said member storing a data word in each one of a plurality of addressable storage cells, the combination comprising: a data word transmission member; said processing unit being adapted to receive data words from said transmission member, to execute a plurality of different sequences of operations on received data words in response to a corresponding plurality of sequences of data words representing instructions, to generate data words representing the processed results of said operations, and to transfer said generated result data words to said transmission member, said processing unit supplying a series of first signal groups symbolically representing the addresses of a coresponding series of contiguous ones of said cells when said processing unit is to communicate with said storage member to execute one of said sequences; said storage member being responsive to a second signal group representing the actual address of one of said cells for transferring a data word between said cell and said transmission member; and an address translating device coupled to said processing unit to receive each of said first signal groups and responsive thereto for generating a corresponding one of said second second signal groups, said translating device responding to said series of first signal groups to provide a series of second signal groups representing the actual addresses of a plurality of sets of contiguous cells, said sets being non-contiguous, said translating device being coupled to deliver said second signal groups to said storage member.

11. For employment with a data processing unit and a data storage member, said member storing a data word in each one of a plurality of addressable storage cells, the combination comprising: a data word transmission member; said processing unit being adapted to receive data words from said transmission member, to execute a plurality of different sequences of operations on received data words in response to a corresponding plurality of sequences of data words representing instructions, to generate data words representing the processed results of said operations, and to transfer said generated result data words to said transmission member, said processing unit supplying a respective series of first signal groups symbolically representing the addresses of a corresponding series of contiguous ones of said cells when said processing unit is to communicate with said storage member to execute each one of said sequences; said storage member being responsive to a second signal group representing the actual address of one of said cells for transferring a data word between said cell and said transmission member; and an address translating device coupled to said processing unit to receive each of said first signal groups and responsive thereto for generating a corresponding one of said second signal groups, said translating device responding to each of said series of first signal groups to provide a respective series of second signal groups representing the actual addresses of sets of contiguous cells, the sets represented by each of said series of second signal groups being non-contiguous, said translating device being coupled to deliver said second signal groups to said storage member.

12. For employment with a system comprising at least one data processing unit and at least one data storage member, said member storing a data word in each one of a plurality of addressable storage cells, the combination comprising: a data word transmission member; said processing unit being adapted to receive data words from said transmission member, to execute a plurality of different operations on received data words, and to transfer data words representing the results of said operations to said transmission member, said processing unit supplying a series of first signal groups symbolically representing the addresses of a corresponding series of contiguous ones of said cells when said processing unit is to communicate with said storage member; said storage member being responsive to a second signal group representing the actual address of one of said cells for transferring a data word between said cell and said transmission member; and an address generation device coupled to said processing unit for receiving each of said first signal groups to generate said second signal group, said generation device generating a series of second signal groups upon receipt of said series of first signal groups, said second signal groups representing the actual addresses of a plurality of sets of contiguous cells, said sets being non-contiguous, said generation device being coupled to deliver said second signal groups to said storage member.

13. For employment with a system comprising at least one data processing unit and at least one data storage member, said member storing a data word in each one of a plurality of addressable storage cells, the combination comprising: a data word transmission member; said processing unit being adapted to receive data words from said transmission member, to execute a plurality of different operations on received data words, and to transfer data words representing the results of said operations to said transmission member, said processing unit supplying a series of first signal groups symbolically representing the addresses of a corresponding series of contiguous ones of said cells when said processing unit is to communicate with said storage member; said storage member being responsive to a second signal group representing the actual address of one of said cells for transferring a data word between said cell and said transmission member; and an address generation device coupled to said processing unit for receiving each of said first signal groups to generate said second signal group, said generation device generating a series of second signal groups upon receipt of said series of first signal groups, said second signal groups representing the actual addresses of a plurality of non-contiguous sets of cells, said generation device being coupled to deliver said second signal groups to said storage member.

14. For employment with a system comprising at least one data processing unit and at least one data storage member, said member storing a data word in each one of a plurality of addressable storage cells, the combination comprising: a data word transmission member; said processing unit being adapted to receive data words from said transmission member, to execute a plurality of different operations on received data words, and to transfer data words representing the results of said operations to said transmission member, said processing unit supplying a series of first signal groups symbolically representing the addresses of a corresponding series of contiguous ones of said cells when said processing unit is to communicate with said storage member, each of said first signal groups comprising a first signal subgroup symbolically identifying a respective block of continguously addressable cells of said storage member and a second signal subgroup representing the relative location of a cell in one of said blocks; said storage member being responsive to a second signal group representing an actual address of one of said cells for transferring a data word between the addressed cell and said transmission member, said second signal group comprising said second signal subgroup and a third signal subgroup actually identifying one of said blocks; means for transferring said second signal subgroup from said processing unit to said storage member; and an address translating device coupled to said processing unit to receive each of said first signal subgroups and responsive thereto for generating said third signal subgroup, said translating device responding to the series of first signal subgroups of said series of first signal groups to provide a series of third signal subgroups, the blocks identified by said series of third signal subgroups being non-contiguous, said translating device being coupled to deliver said third signal subgroups to said storage member.

15. The system of claim 14 wherein each of said third signal subgroups represent the actual address of the first cell of one of said blocks.

16. The system of claim 14 wherein each of said first signal subgroups symbolically represent the address of the first cell of one of said blocks and each of said third signal subgroups represent the actual address of the first cell of one of said blocks.

17. A data processing system comprising at least one data processing unit; at least one data storage member, said member storing a data word in each of a plurality of addressable storage cells; a data word transmission member; said processing unit being adapted to receive data words from said transmission member, to execute a plurality of different operations on received data words, and to transfer data words representing the results of said operations to said transmission member, said processing unit supplying a series of first signal groups symbolically representing the addresses of a corresponding series of contiguous ones of said cells when said processing unit is to communicate with said storage member; said storage member being responsive to a second signal group representing the actual address of one of said cells for transferring a data word between said cell and said transmission member; and an address translating device coupled to said processing unit to receive each of said first signal groups and responsive thereto for generating said second signal group, said translation device responding to said series of first signal groups to provide a series of second signal groups representing the actual addresses of a plurality of sets of contiguous cells, said sets being non-contiguous, said translating device being coupled to deliver said second signal groups to said storage member.

18. For employment with a data processing unit and a data storage member, said member storing a data word in each one of a plurality of addressable storage cells, the combination comprising: a data word transmission member; said processing unit being adapted to receive data words from said transmission member, to execute a plurality of different operations on received data words, and to transfer data words representing the results of said operations to said transmission member, said processing unit supplying first signal groups representing a continuous series of symbolic addresses of said cells when said processing unit is to communicate with said storage member; said storage member being responsive to a second signal group representing the actual address one of said cells for transferring a data word between said cell and said transmission member; and an address translating device coupled to said processing unit to receive each of said first signal groups and responsive thereto for generating a corresponding one of said second signal groups, said translating device responding to said first signal groups to provide second signal groups reprsenting a plurality of separated sets of actual addresses of said cells, each of said sets comprising a continuous subseries of actual addresses, said translating device being coupled to deliver said second signal group to said storage member.

References Cited

UNITED STATES PATENTS

| | | | |
|---|---|---|---|
| 3,323,108 | 5/1967 | Mullery et al. | 340—172.5 |
| 3,311,887 | 3/1967 | Muroga | 340—172.5 |
| 3,303,477 | 2/1967 | Volgt | 340—172.5 |
| 3,292,151 | 12/1966 | Barnes et al. | 340—172.5 |
| 3,289,175 | 11/1966 | Rice | 340—172.5 |
| 3,273,130 | 9/1966 | Baskin et al. | 340—172.5 |
| 3,270,324 | 8/1966 | Meade et al. | 340—172.5 |
| 3,253,265 | 5/1966 | Lindquist | 340—172.5 |

GARETH D. SHAW, Primary Examiner